United States Patent
Becker (10) Patent No.: US 7,334,310 B2
(45) Date of Patent: Feb. 26, 2008

(54) METHOD FOR PRODUCTION OF CLOSURE FOR A MEDICINE BOTTLE

(75) Inventor: Bernd Becker, Aachen (DE)

(73) Assignee: West Pharmaceutical Services Deutschland GmbH & Co., KG, Eschweiler (DE)

( * ) Notice: Subject to any disclaimer, the term of this patent is extended or adjusted under 35 U.S.C. 154(b) by 108 days.

(21) Appl. No.: 11/379,235

(22) Filed: Apr. 19, 2006

(65) Prior Publication Data

US 2007/0080129 A1    Apr. 12, 2007

Related U.S. Application Data

(60) Division of application No. 10/728,493, filed on Dec. 5, 2003, now Pat. No. 7,137,519, and a continuation of application No. PCT/EP02/04233, filed on Apr. 17, 2002.

(30) Foreign Application Priority Data

Jun. 7, 2001  (DE) ................. 101 27 823

(51) Int. Cl.
  *B23P 25/00*    (2006.01)
  *B29C 70/80*    (2006.01)
(52) U.S. Cl. .................. 29/458; 29/460; 29/527.1; 29/527.2; 264/268; 215/249; 604/415
(58) Field of Classification Search ............... 29/458, 29/460, 527.1, 527.2; 264/239, 250, 268; 215/249, 305, 364, 254.1, DIG. 3; 604/415
See application file for complete search history.

(56) References Cited

U.S. PATENT DOCUMENTS

| | | |
|---|---|---|
| 3,278,063 A | 10/1966 | Kranzhoff |
| 3,838,785 A | 10/1974 | Lancesseur |
| 3,888,377 A | 6/1975 | Stadler |
| 4,407,424 A | 10/1983 | Heyn |
| 4,482,069 A * | 11/1984 | Stadler ..................... 215/249 |
| 4,501,372 A | 2/1985 | Hansen |
| 4,512,486 A | 4/1985 | Kobayashi et al. |
| 4,746,017 A | 5/1988 | Howard et al. |
| 4,892,222 A | 1/1990 | Schmidt et al. |

(Continued)

FOREIGN PATENT DOCUMENTS

DE    28 44 206 A1    4/1980

(Continued)

*Primary Examiner*—Jermie E. Cozart
(74) *Attorney, Agent, or Firm*—Panitch Schwarze Belisario & Nadel LLP (57) ABSTRACT

A closure (1) for a medicament bottle has a cap portion (2), which can be joined to the bottle and which has at least one opening (3) closed by an elastic, puncturable sealing layer (4). The opening (3) is covered on the exterior of the cap portion by a cover element (5) which, with its edge area (6) that encircles the opening (3), is joined with positive, interlocking fit, but without material bonding with the rim (8) of the opening (3). The sealing layer touches the rear side of the covering element facing the opening in a manner that is flush, sterile and without material bonding. The closure is made by a process in which the cap portion and cover element(s) are first produced and joined together, and then the sealing layer is injected into the cap portion.

4 Claims, 5 Drawing Sheets

U.S. PATENT DOCUMENTS

| | | |
|---|---|---|
| 5,016,770 A | 5/1991 | Rizzardi |
| 5,379,908 A | 1/1995 | Rohe |
| 5,467,878 A | 11/1995 | Derksen |
| 5,678,713 A | 10/1997 | Derksen |
| 5,823,373 A | 10/1998 | Sudo et al. |
| 6,050,435 A | 4/2000 | Bush et al. |
| 6,223,918 B1 | 5/2001 | Browne |
| 6,868,978 B2 | 3/2005 | Amschlinger et al. |

FOREIGN PATENT DOCUMENTS

| | | |
|---|---|---|
| EP | 0 364 783 B1 | 9/1989 |
| EP | 0 503 330 A1 | 2/1992 |
| EP | 0 614 820 A1 | 3/1994 |
| EP | 0 721 896 A1 | 12/1995 |

\* cited by examiner

METHOD FOR PRODUCTION OF CLOSURE FOR A MEDICINE BOTTLE

CROSS-REFERENCE TO RELATED APPLICATIONS

This application is a Divisional of U.S. patent application Ser. No. 10/728,493, filed Dec. 5, 2003 now U.S. Pat. No. 7,137,519, which was a Continuation of International Application No. PCT/EP02/04233, filed Apr. 17, 2002, which was published in the German language on Dec. 12, 2002 under International Publication No. WO 02/098748A1, the disclosure of which is incorporated herein by reference.

BACKGROUND OF THE INVENTION

The invention relates to a process for producing a closure for a medicine bottle having a cap portion with at least one cap opening sealed off by an elastic, puncturable sealing layer and covered by a cover element, wherein the at least one cover element and the cap portion are produced and joined together, and then the elastic sealing layer is injected into the cap portion. The invention further relates to a closure for a medicine bottle, which has a cap portion connectable to the bottle, the cap portion having at least one opening which is sealed off by an elastic, puncturable sealing layer, the opening being closed off on the outside by a cover element which is tightly and releasably connected to the rim of the opening.

German Patent DE 38 35 720 C2 discloses a closure of this kind, which has a pot-shaped cap portion, having on its wall overlapping the opening of the medicine bottle an opening which, in the position of use, is sealed off by a puncturable sealing layer. On the outside of the cap portion a removable film is provided as the cover element, which covers the puncturable area of the sealing layer provided on the opening. On its edge region surrounding the opening the cover film is firmly but releasably attached to the rim of the opening of the cap portion. The puncturable area of the sealing layer is thereby protected from dirt and from the penetration of pathogens.

As a rule, the contents of a medicine bottle of this kind are removed by means of a hollow needle or cannula, which is used to pierce the sealing layer. First of all, the cover film must be pulled upwards or torn off to expose the puncturable portion of the sealing layer.

When producing the closure cap, the cover film is first placed in a molding tool for the cap portion. Then, to mold the cap portion, hot plastic material is injected into the molding tool. The cover element then bonds firmly but releasably to the cap portion. However, it is difficult to adjust the removal or retaining forces for the cover film, such that the film can be easily pulled away from the cap portion, but is still attached to the cap portion firmly enough, so that it cannot become detached during transportation or during the handling of the medicine container. If the removal forces are too great, the gripping tab provided on the cover element can tear off when the cover film is torn off, with the result that the contents of the bottle cannot be removed. However, if the removal forces are too small, there is no longer any guarantee of biological safety, and the puncturable part of the sealing layer may become soiled or come into contact with bacteria, pathogens or the like, when the cover film comes away from the cap portion.

BRIEF SUMMARY OF THE INVENTION

An object of the invention is therefore to provide a closure of the type mentioned above, which has high biological safety and is easy and safe to handle. A further aim is to provide a process of the type mentioned above, which allows a closure of this kind to be manufactured easily.

The solution to this object in terms of the process comprises first producing the cap portion; then, when producing the at least one cover element, injecting the material of the cover element around the edge region of the cap portion surrounding the cap opening, in order to form an interlocking joint between the cover element and the cap portion; and selecting the materials of the cover element, cap portion and sealing layer so that the material of the cover element does not enter into a materially integrated joint either with the material of the cap portion or with the material of the sealing layer.

Advantageously, the injection of the material of the cover element around the cap portion forms an interlocking joint between the cap portion and the cover element, which securely seals the connecting area. Since a materially integrated connection or welding of the cover element to the cap portion and/or to the sealing layer is avoided, the cover element can be pulled off the cap portion with a defined removal force to expose the puncturable part of the sealing layer. Since the elastic sealing layer is injected into the cap portion connected to the cover element after the production of the cover element and cap portion, the reverse side of the cover element facing the sealing layer is sterilized by the material of the sealing layer, which is still hot during the injection process. At the same time, this material comes into direct contact with the reverse side of the cover element, resulting in an easily releasable flush connection between the cover element and the sealing layer extending over the entire cross section of the opening. There is no gap between the cover element and the sealing layer in which pathogens, bacteria, viruses or the like could survive.

The problem mentioned above may also be solved, in terms of a process of the kind described, wherein the at least one cover element and then the cap portion are produced first, by injecting the cap material around the edge region of the cover element in order to form an interlocking connection between the cover element and the cap portion during the manufacture of the cap portion, and selecting the materials of the cover element, cap portion and sealing layer so that the material of the cover element does not enter into a materially integrated connection either with the material of the cap portion or with the material of the sealing layer.

By this solution, too, a reliably sealed, positively interlocking connection can be achieved between the cap portion and the cover element, in which the cover element can be pulled off the cap portion with a defined removal force to expose the sterile, puncturable part of the sealing layer.

It is advantageous if the sealing layer is welded to the cap portion when injected into it. The sealing layer is then tightly connected to the cap portion on the inside of the cap, thus avoiding even tiny gaps between the sealing layer and the cap portion. This ensures improved biological reliability of the closure.

The solution to the problem mentioned above in terms of the closure comprises connecting the cover element to the rim of the opening of the cap opening by interlocking engagement, with no material bonding, by its edge region surrounding the opening, and having the sealing layer make flush, sterile contact with the reverse side of the cover element facing the opening, without any material bonding.

The cover element is thus connected by interlocking engagement and free from any material bond to the rim of the opening of the cap opening along its edge region surrounding the opening, thereby ensuring on the one hand a reliable seal between the cover element and the cap portion and thus ensuring a high degree of biological safety of the closure. On the other hand, however, the removal force that must be exerted between the cap portion and the cover element to open or remove the cover element from the cap portion is precisely defined, thus enabling the cover element to be removed easily from the cap portion. This removal force is determined, on the one hand, by the shape and dimensions of the interlockingly engaging areas of the cover element and cap portion and, on the other hand, by the materials of the cover elements and cap portion. When developing or constructing the closure, the removal force can be set by a suitable choice of dimensions and/or by a suitable choice of materials.

It is advantageous if the rim of the opening of the cap portion engages behind an undercut of the cover element preferably formed on an encircling groove of the cover element. In this way a good seal is achieved between the cover element and the cap portion, on the one hand. On the other hand, however, the cover element is permanently deformed in the region of the undercut as it is pulled away from the cap portion, so that after being removed from the cap portion it cannot be fitted back onto the undercut and connected thereto. The cover element then also acts as a tamper-evident seal.

In another advantageous embodiment of the invention, the cover element is constructed as a cover cap which engages with its edge region behind at least one undercut in the cap portion formed around the groove encircling the cap portion opening. In this embodiment, too, the cover element is permanently deformed in the region of the undercut as the cap portion is pulled off. Here again, a tight seal is produced between the sealing element and the cap portion.

The at least one cover element may comprise a duroplastic material, and the sealing layer may comprise a thermoplastic material. In this way, when the closure is produced, a connection between the cap portion and the cover element, which is free from any material bond, may be easily achieved.

In another advantageous embodiment of the invention, the at least one cover element and the sealing layer may comprise different thermoplastic materials which cannot be welded together. The cover cap may then comprise polyamide or polyacetate, for example, and the sealing layer may comprise polyethylene or polypropylene.

In one embodiment of the invention the sealing layer is welded flush onto the cap portion on the inside of the cap. This produces a particularly tight and firm connection between the sealing layer and the cap portion.

It is particularly advantageous if the cover element has at least one gripping tab arranged to extend transversely and particularly at right angles to the plane spanned by the opening, preferably centrally to the opening of the cap portion. The cover element can then be held comfortably by the gripping tab in order to remove it from the cap portion.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
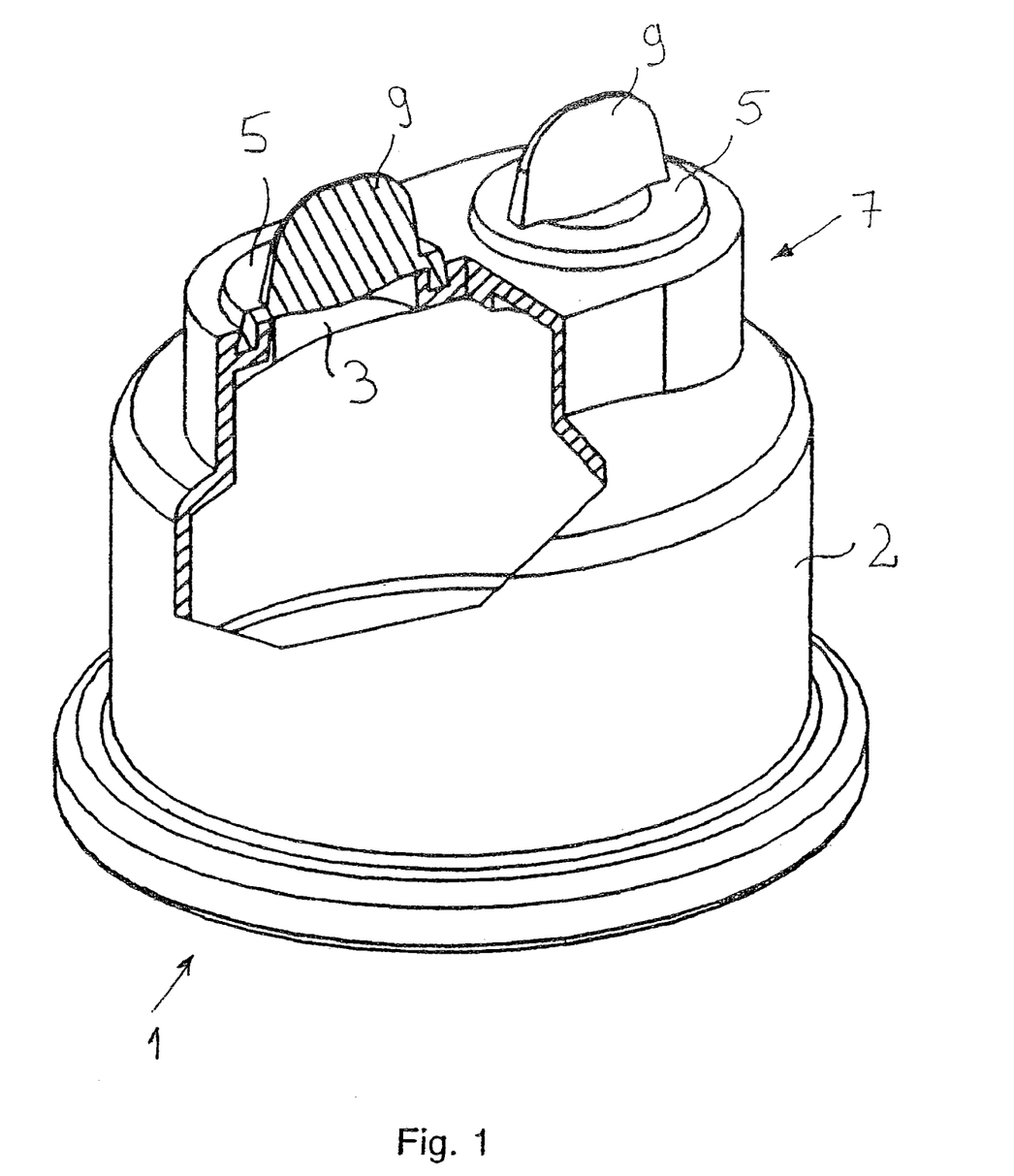
FIG. 1 is a perspective view, partly in section, of a cap portion of a closure for a medicine bottle according to the invention, in which openings in the cap portion are tightly sealed by cover elements.

As shown in FIG. 1, a closure, generally designated 1, for a medicine bottle or similar container has a cap portion 2 connectable to the container (not shown). The cap portion 2 has two substantially circular openings 3 on its wall portion which overlaps the container opening in the position of use. These openings 3 are closed off by an elastic sealing layer capable of being punctured with a hollow needle. The openings are each covered on the outside of the cap portion 2 by a cover element 5, which is connected in a positively interlocking and releasable manner by its edge region 6 (see FIG. 3) surrounding the opening 3 to the edge region of the cap portion 2 surrounding the opening 3. At the connecting points between the cap portion 2 and the cover element 5 the materials of the cap portion 2 and cover element 5 are present separately from each other, i.e., there is no materially integrated connection between these materials. At its free edge the cap portion 2 has a seal (not shown in detail in the drawings) which fits closely against the container in the position of use.

FIGS. 2 to 5 show that the sealing layer 4 is disposed in the inner cavity of the cap portion 2 and makes contact with the reverse side of the cover element 5 facing the inner cavity, without any material bond. The sealing layer rests flush and sterile on the cover element 5 over the entire cross section of the openings 3. At the points where the sealing layer 4 makes contact with the cap portion 2, it is welded to the cap portion 2, so as to produce a strong and leak-tight connection over the entire circumference of the cap portion 2 between the cap portion 2 and the sealing layer 4.

Figure 2:
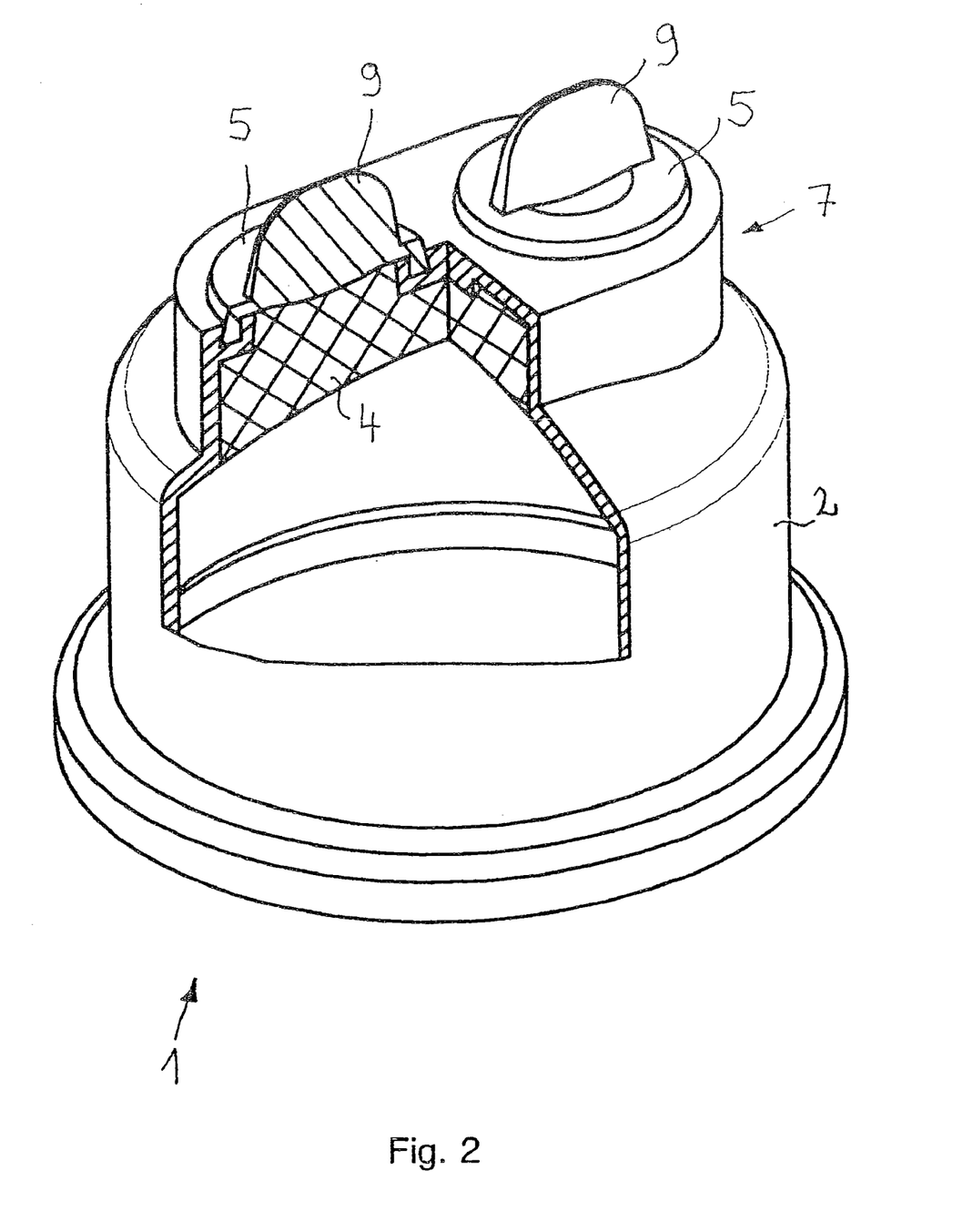
FIG. 2 is a perspective view, partly in section, of the finished closure after a sealing layer has been injected into the cap portion shown in FIG. 1.
Figure 4:
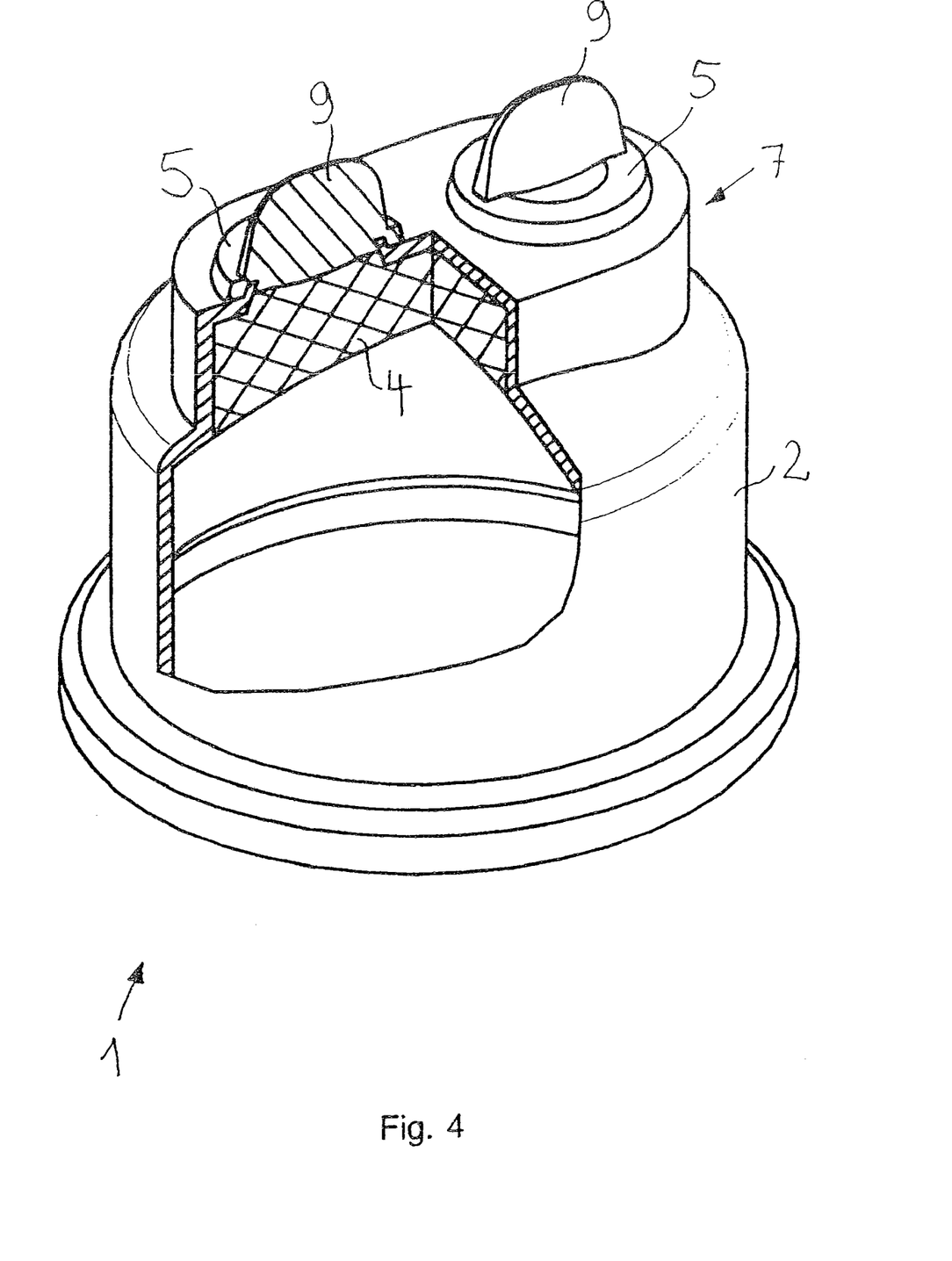
FIG. 4 is a perspective view of a closure of the invention similar to FIG. 2, but with the opening edges of the cap portion interlockingly engaging in grooves in the cover element.

The cap portion 2 has a substantially pot-shaped base member which has, on its wall portion overlapping the container opening in the position of use, a recess 7 that enlarges the inner cavity of the base member. This recess forms a projection or a step on the outside of this wall portion. FIGS. 2 and 4 show that the openings 3 are provided on the wall of this recess 7 that projects furthest and that the sealing layer 4 is disposed in the inner cavity of the recess 7.

Figure 3:
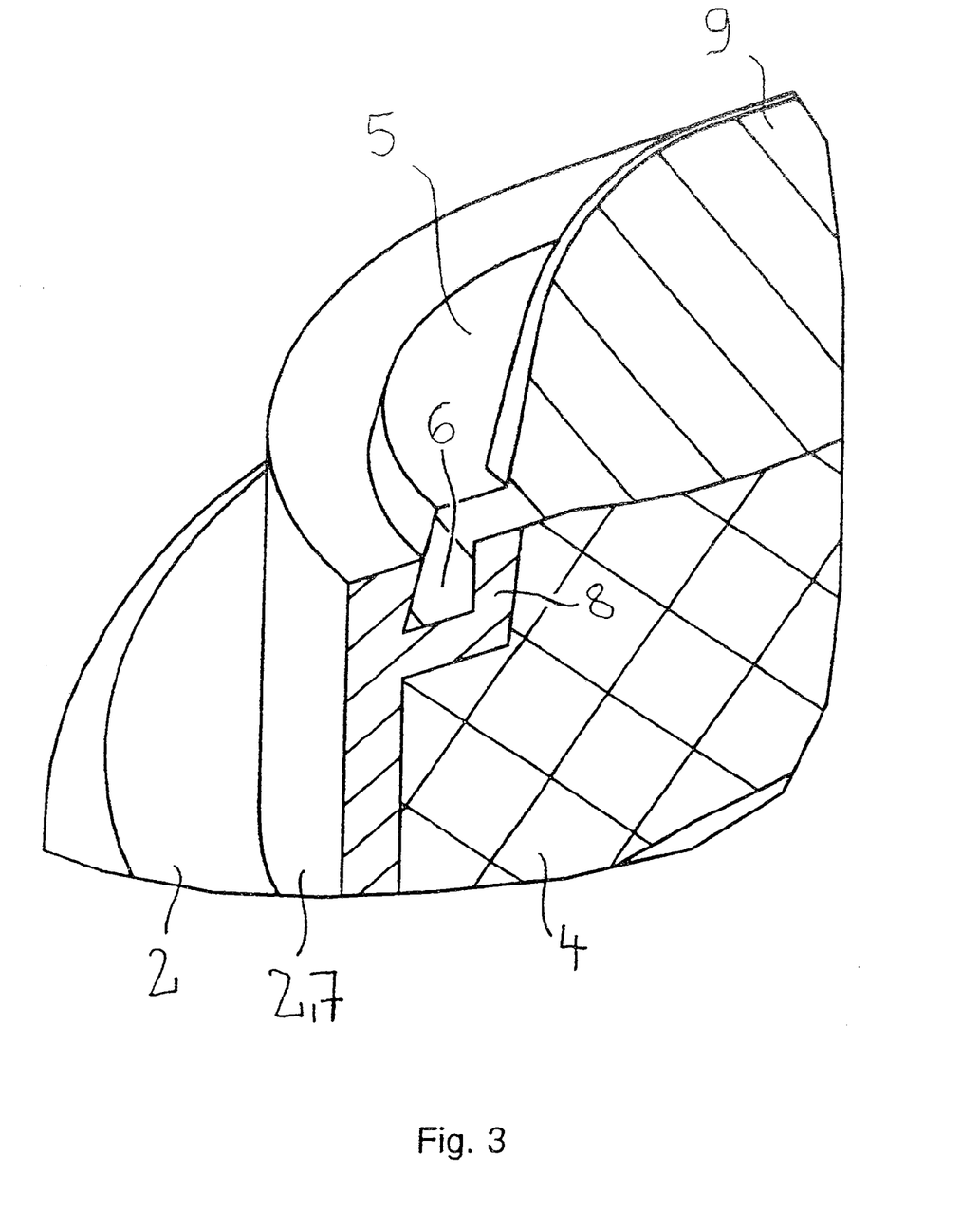
FIG. 3 is a detail from FIG. 2 on an enlarged scale, in which the interlockingly engaging connection between the cover element and the cap portion is shown particularly clearly.

In the embodiment according to FIGS. 2 and 3 the rim 8 of the opening 3 of the cap portion 2 is surrounded by an annular groove encircling the opening 3 which accesses the outside of the cap portion 2. The cross section of the annular groove widens out from the adjacent surface region of the cap portion 2 toward the deepest point of the annular groove. FIG. 3 shows that this is achieved by the fact that at least one lateral boundary wall of the annular groove has an undercut. The cover elements 5 are in the shape of caps and engage with their edges in the annular groove, where they engage behind the undercut. FIG. 3 shows that the edge of the cover element 5 completely fills the annular groove of the cap portion 2. The cover elements 5 comprise a material that is softer than that of the cap portion 2 and irreversibly deforms, at least at an edge region engaging in the annular groove associated with the cover element 5, when a cover element 5 is pulled off from the cap portion, so that after the cover element has been pulled off the cap portion 2 it cannot be re-inserted in the annular groove.

Figure 5:
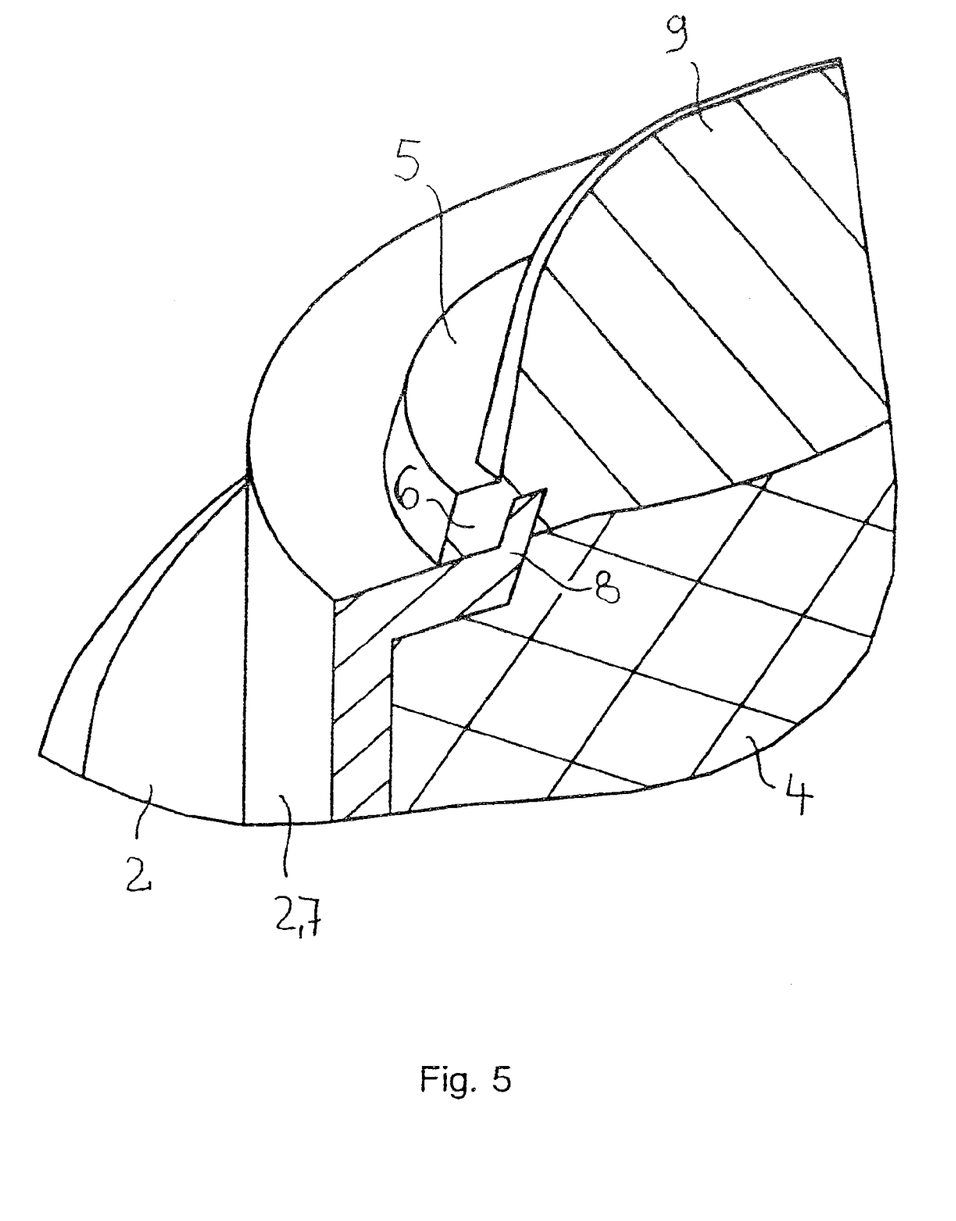
FIG. 5 is a detail from FIG. 4 on an enlarged scale, in which the interlockingly engaging connection between the cover element and the cap portion is shown particularly clearly.

FIGS. 4 and 5 show another embodiment, by way of example, wherein the cover elements 5 have, on their reverse side facing the cap portion in the position of use, an annular groove associated with them encircling the opening 3 of the cap portion. A collar-shaped projection surrounding the opening 3 and provided on the rim 8 of the opening 3 of the cap portion 2 engages in this annular groove. FIG. 4 shows that the side walls of the annular groove, in a diametric plane containing the central longitudinal axis of the cap portion, extend diagonally with respect to this central longitudinal axis, so as to form undercuts behind which the rim of the opening engages. FIG. 5 shows that the rim 8 of the opening totally fills the annular groove of the cover element 5.

Integrally formed on each of the cover elements 5 is a gripping tab 9, whose plane extends substantially at right angles to the plane of the cover element 5. FIGS. 2 and 4 show that the gripping tab 9 is connected roughly in a T-shape to the cover element 5. The plane of the gripping tab extends substantially in a diametric plane of the opening 3 containing the central longitudinal axis of the opening 3.

When producing the closure shown in FIG. 2, first of all a hot liquid plastic composition, preferably acrylonitrile-butadiene-styrene copolymer (ABS), polyamide (PA) or polyoxymethylene (POM), is injected into the mold cavity of a first molding tool to produce the cover elements 5. After the plastic has solidified the cover elements 5 are taken out of the first molding tool and placed in the mold cavity of a second molding tool in order to mold on the cap portion 2. The mold cavity of this second molding tool is larger than the mold cavity of the first molding tool by the amount of space needed for the cap portion. A second hot, liquid plastic composition, preferably polyethylene (PE) or polypropylene (PP), is injected into the second molding tool in order to mold the cap portion. The plastic composition of the cap portion 2 is injected around the edge of the cover elements 5. The materials of the cover elements 5 and cap portion 2 are chosen so that they do not enter into any materially integrated connection while the cap portion 2 is being molded. Consequently, after the second plastic composition has hardened, there is merely an interlockingly engaging connection between the cap portion 2 and the cover elements 5.

Then, in another manufacturing step, the elastic sealing layer 4 is injected into the cap portion thus connected to the cover elements 5, as shown in FIG. 1. For this step, the cap portion 2 with the cover elements 5 is removed from the second molding tool and placed in a third molding tool. To form the sealing layer 4 a third hot, liquid plastic composition, preferably TPE, is injected into the third molding tool. The material of the sealing layer 4 enters into a materially integrated bond with the material of the cap portion 2 and is welded thereto. The materials of the cover elements 5 and the sealing layer 4 are selected so that there is no materially integrated bond between the cover elements 5 and the sealing layer 4. As a result, the cover elements 5 are easily detachable from the sealing layer 4. As the sealing layer 4 is formed, the hot material of the sealing layer, which is preferably at a temperature of about 250° C., is applied to the surface regions of the cover element 5 covering the opening 3 and sterilizes them.

In the manufacture of the closure shown in FIG. 4, first of all a hot, liquid plastic composition, preferably PE or PP, is injected into the mold cavity of a first molding tool to produce the cap portion 2. After the plastic has solidified, the cap portion 2 is taken out of the first molding tool and placed in the mold cavity of a second molding tool in order to mold on the cover elements 5. The mold cavity of this second molding tool is larger than the mold cavity of the first molding tool by the amount of space needed for the cover elements 5. A second hot, liquid plastic composition, preferably ABS, PA or POM, is then injected into the second molding tool in order to mold the cover elements 5. The plastic composition penetrates into the annular grooves of the cap portion 2 bounding the openings 3 and fills them completely. The materials of the cap portion 2 and cover element 5 are chosen so that during the forming of the cover elements 5 onto the cap portion 2 they do not enter into a materially integrated bond with one another. After the second plastic composition has solidified, a merely interlocking engagement is thus obtained between the cap portion 2 and the cover elements 5.

The cap portion thus connected to the cover elements 5 is taken out of the second molding tool and placed in a third molding tool in order to form the sealing layer 4. The other manufacturing steps correspond to those described above for the embodiment illustrated in FIG. 1 to 3.

Thus, all in all, a closure 1 for a medicine bottle is obtained having a cap portion 2 connectable to the bottle, this cap portion having at least one opening 3 sealed off by an elastic, puncturable sealing layer. The opening is covered on the outside of the cap by a cover element which interlockingly engages, by means of its edge region encircling the opening, with the rim of the opening of the cap portion, without any material bonding thereto. The sealing layer is in flush and sterile contact, with no material bonding, with the reverse side of the cover element facing the opening.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A process for producing a closure (1) for a medicine bottle having a cap portion (2) with at least one cap opening (3) sealed off by an elastic, puncturable sealing layer (4) and covered by a cover element (5), the process comprising producing and joining together the at least one cover element (5) and the cap portion (2), and then injecting a material of the elastic sealing layer (4) into the cap portion (2), wherein first the cap portion (2) is produced, then during manufacture of the at least one cover element (5) injecting a material of the cover element (5) around an edge region (6) of the cap portion (2) surrounding the cap opening (3) to form an interlockingly engaging connection between the cover element (5) and the cap portion (2), and wherein the materials of the cover element (5), cap portion (2) and sealing layer (4) are selected such that the material of the cover element (5) does not enter into a materially integrated bond either with the material of the cap portion (2) or with the material of the sealing layer (4).

2. The process according to claim 1, wherein on being injected into the cap portion (2) the sealing layer (4) becomes welded thereto.

3. A process for producing a closure (1) for a medicine bottle having a cap portion (2) with at least one cap opening (3) sealed off by an elastic, puncturable sealing layer (4) and covered by a cover element (5), the process comprising producing and joining together the at least one cover element (5) and the cap portion (2), and then injecting a material of the elastic sealing layer (4) into the cap portion (2), wherein first the at least one cover element (5) and then the cap portion (2) are produced, and forming an interlockingly engaging connection between the cover element (5) and the cap portion (2) the cap material by injecting a material of the cap portion (2) around an edge region (6) of the cover element during production of the cap portion (2), and wherein the materials of the cover element (5), cap portion (2) and sealing layer (4) are selected such that the material of the cover element (5) does not enter into a materially integrated bond either with the material of the cap portion (2) or with the material of the sealing layer (4).

4. The process according to claim 3, wherein on being injected into the cap portion (2) the sealing layer (4) becomes welded thereto.

* * * * *